United States Patent
Hattrup et al.

(10) Patent No.: US 9,596,726 B2
(45) Date of Patent: *Mar. 14, 2017

(54) DRIVER DEVICE AND DRIVING METHOD FOR DRIVING A LOAD, IN PARTICULAR AN LED UNIT

(71) Applicant: KONINKLIJKE PHILIPS N.V., Eindhoven (NL)

(72) Inventors: Christian Hattrup, Wurselen (DE); Georg Sauerländer, Aachen (DE); Carsten Deppe, Aachen (DE)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/008,630

(22) Filed: Jan. 28, 2016

(65) Prior Publication Data

US 2016/0143105 A1 May 19, 2016

Related U.S. Application Data

(63) Continuation of application No. 13/980,061, filed as application No. PCT/IB2012/050173 on Jan. 13, 2012, now Pat. No. 9,271,348.

(30) Foreign Application Priority Data

Jan. 17, 2011 (EP) .................................. 11151137

(51) Int. Cl.
*H05B 37/00* (2006.01)
*H05B 39/00* (2006.01)
*H05B 33/08* (2006.01)

(52) U.S. Cl.
CPC ..... *H05B 33/0815* (2013.01); *H05B 33/0812* (2013.01); *Y02B 20/343* (2013.01)

(58) Field of Classification Search
CPC ............ H05B 33/0815; H05B 33/0812; Y02B 20/343

(Continued)

(56) References Cited

U.S. PATENT DOCUMENTS 7,065,303 B1 6/2006 Kerem
7,271,642 B2 9/2007 Chen
(Continued)

FOREIGN PATENT DOCUMENTS

EP 1783840 A1 5/2007
JP 5136461 A 6/1993
(Continued)

OTHER PUBLICATIONS

F. Stolpe; "Photographic Workshop Light", Elektor, Canterbury, GB, vol. 19, No. 217, Dec. 1, 1993, pp. 88-90, XP000417220.

*Primary Examiner* — Kenneth B Wells (57) ABSTRACT

In various embodiments a device and method for providing power to an LED unit and modulating light emitted from the LED unit is disclosed. In one example, the device is configured to be connected between a driver and the LED unit. In this example, the device comprises a controllable resistor that receives from the driver a driver output voltage and to provides a load current to power the LED unit, a frequency filter for providing a substantially constant voltage to the LED unit, the frequency filter being connected to the controllable resistor to provide a substantially constant electrical power to the LED unit, and a modulator coupled in series to the LED unit for modulating the drive current and for modulating the emitted light output, wherein the substantially constant voltage applied to the LED unit is further applied to the modulator by means of the frequency filter.

20 Claims, 6 Drawing Sheets (58) Field of Classification Search
USPC .......................... 315/185 R, 200 R, 291, 312
See application file for complete search history.

(56) References Cited

U.S. PATENT DOCUMENTS

| | | | |
|---|---|---|---|
| 7,352,138 B2 | 4/2008 | Lys | |
| 7,496,297 B2 | 2/2009 | Sun | |
| 8,207,685 B2 | 6/2012 | Cheng | |
| 8,310,171 B2 | 11/2012 | Reisenauer | |
| 8,319,445 B2 | 11/2012 | McKinney | |
| 8,598,797 B2 | 12/2013 | Choutov | |
| 9,271,348 B2 * | 2/2016 | Hattrup | H05B 33/0812 |

FOREIGN PATENT DOCUMENTS

| | | | |
|---|---|---|---|
| JP | 7058704 A | 3/1995 | |
| JP | 2004119078 A | 4/2004 | |
| JP | 2007251864 A | 9/2007 | |
| JP | 2007266795 A | 10/2007 | |
| JP | 200852994 A | 3/2008 | |
| WO | 03096761 A1 | 11/2003 | |
| WO | 2004003869 A1 | 1/2004 | |
| WO | 2009010909 A1 | 1/2009 | |

* cited by examiner

DRIVER DEVICE AND DRIVING METHOD FOR DRIVING A LOAD, IN PARTICULAR AN LED UNIT

CROSS-REFERENCE TO PRIOR APPLICATION

This application is a Continuation of U.S. Ser. No. 13/980,061, filed Jul. 17, 2013, now issued U.S. Pat. No. 9,271,348, which is the U.S. National Phase application under 35 U.S.C. §371 of International Application No. PCT/IB2012/050173, filed on Jan. 13, 2012, which claims the benefit of European Patent Application No. 11151137.4, filed on Jan. 17, 2011. These applications are hereby incorporated by reference herein.

FIELD OF THE INVENTION

The present invention relates to a driver device and a corresponding driving method for driving a load, in particular an LED unit comprising one or more LEDs. Further, the present invention relates to a light apparatus. The present invention relates further to a driver device comprising a modulator to modulate the output of an LED unit.

BACKGROUND OF THE INVENTION

In the field of LED drivers for offline application, solutions are demanded to achieve, inter alia, high efficiency, high power density, long life time, high power factor or low cost. The LED units known from the prior art are usually designed to be connected to a DC-voltage supply. An LED unit including a driver circuit designed to be connectable to a DC-voltage supply is e.g. known from JP 5136461A. Practically, the LEDs and the driver circuits should be designed to be connectable to the mains input and should transform the mains energy into the form required by the LEDs while keeping compliance with present and future power mains regulations. It is of critical importance to guarantee a high efficiency of the LEDs even if the supply voltage of the mains input is a voltage having a variation of up to ±10%.

Usually, a rectifier bridge is used to connect the LEDs to the mains input to provide a DC voltage, which is necessary to drive the LED unit. The rectified voltage usually still comprises an AC component and the efficiency normally decreases considerably in the case of variations of the input voltage.

Further, it is known in the field of LEDs to modulate the light output of a lamp and to embed information into the light in a way not visible to the user. This modulated light can send data to a receiver located beneath or in the proximity of the respective lamp. A method of modulating light signals is described in detail in WO 2009/010909.

The driving circuits to modulate the light output are usually complex and include a large amount of components.

SUMMARY OF THE INVENTION

It is an object of the present invention to provide a driver device, which is adapted to connect a load, in particular an LED unit, to the mains input, and which has an improved efficiency and to provide a corresponding method. Further, it is an object of the present invention to provide a corresponding light apparatus. It is a still further object of the present invention to provide an improved and simplified modulator to modulate the light output of an LED unit.

According to an aspect of the present invention, a driver device is provided for driving a load, in particular an LED unit including one or more LEDs, comprising:
  a power input unit for receiving an input voltage from an external power supply and for providing a rectified supply voltage,
  a controllable resistor for providing a load current to power the load, and
  a frequency filter connected to the power input unit for providing a voltage to the load,
  wherein the frequency filter is partially coupled in parallel to the load and connected to the controllable resistor to provide a substantially constant electrical power to the load.

According to another aspect of the present invention, a corresponding driving method is provided.

According to another aspect of the present invention, a driver device is provided comprising a modulator, which is coupled in series to an LED unit for modulating a drive current driving the LED unit and for modulating the light output emitted from the LED unit, the modulator including a resistor and a controllable switch coupled in parallel to each other to provide at least two different drive current levels.

According to still another aspect of the present invention, a light apparatus is provided comprising a light assembly comprising one or more light units, in particular an LED unit comprising one or more LEDs, and a driver device for driving said light assembly as provided according to the present invention.

Preferred embodiments of the invention are defined in the dependent claims. It shall be understood that the claimed driving method and the claimed light apparatus have similar and/or identical preferred embodiments as the claimed driver device and as defined in the dependent claims.

The present invention is based on the idea to provide a driver circuit by which a substantially constant electrical power is applied to the load by providing a DC component (constant voltage or constant current) to the load, in particular to the LED unit, and wherein an AC component of the rectified voltage is cut off by means of the frequency filter and the controllable resistor. This is achieved by deriving a nearly constant voltage from the rectified voltage by means of the frequency filter, wherein the AC component of the rectified voltage is applied to the controllable resistor which is controlled by means of the frequency filter. Thus, the AC component is not applied to the load; in particular it is not applied to the LED unit. In this way, the electrical power applied to the load, in particular to the LED unit, does not comprise significant AC components, which would lead to a decreased efficiency and unwanted AC components in the light output (flicker). This driving circuit reduces the driver losses and increases the system efficiency compared to state of the art solutions. Further, it automatically adapts the LED power even if the input voltage changes. According to the present invention, the frequency filter is partially coupled in parallel to the load, i.e. at least one component of the frequency filter is connected in parallel to the load, wherein the voltage provided by the frequency filter component drops at least partially across the load and, if applicable, partially across additional devices connected in series to the load.

The second aspect of the present invention relates to a driver device comprising a modulator to modulate the drive current and to modulate the light output emitted from an LED unit. This modulator can be used in combination with the driver device according to the first aspect of the present invention. Further, the driver device according to the first aspect of the present invention and the driver device comprising the modulator according to the second aspect of the present invention can be used independently of each other in different circuits. The driver device including the modulator is based upon the idea that the light output emitted from the LED unit corresponds to the current driving the LED units. The modulator comprises a resistor and, parallel thereto, a controllable switch, which is controlled, e.g. by a controller. This provides a cheap and simple solution to provide two drive current levels by switching the controllable switch. If the switch is closed, the current is at a high level, while the current is at a lower level if the switch is opened and the current is passed through the resistor. This driving circuit provides a simple possibility to modulate the light output up to the MHz range. Thus, an easy and simple circuit to modulate the drive current of the LED unit can be provided.

In an embodiment of the driver device, the frequency filter comprises a capacitor coupled to the controllable resistor, so that a voltage dropping across the capacitor is at least partially applied as a control voltage to a control input of the controllable resistor to drive the controllable resistor. That is to say, the voltage is at least partially applied to the control input of the controllable resistor, and, if applicable, partially applied to additional devices connected in series to the control input of the controllable resistor. This embodiment provides a load current to the load without significant AC-components and with low technical effort.

According to a further embodiment, the frequency filter is connected to the power input unit to derive a voltage, in particular a substantially constant voltage, from the rectified supply voltage, wherein the voltage is at least partially applied to a series connection of the control side of the controllable resistor and the load. This embodiment provides a simple possibility to apply a constant power to the load with low technical effort.

In an embodiment of the driver device, the frequency filter is a low-pass filter comprising a capacitor and a resistor, wherein the resistor is coupled to the controllable resistor, in particular connected to an input contact and a control contact of the controllable resistor, wherein a substantially constant voltage drops across the capacitor and a second voltage including an AC component of the rectified supply voltage drops across the resistor. This embodiment is a simple possibility to provide a frequency filter and to provide a nearly constant voltage to the load and to cut off the main AC components of the rectified voltage.

According to a further embodiment, a control contact of the controllable resistor is connected to a node between the resistor and the capacitor. This provides a simple solution to drive the controllable resistor by means of the frequency filter and to cut off the main AC-components of the rectified voltage.

In a further embodiment, a voltage limiting device is coupled to the controllable resistor, in particular to limit the second voltage dropping across the resistor. This voltage limiting device, which is preferably formed of a Zener diode, e.g. having a forward voltage of 20 to 30 V, provides quick charging of the capacitor of the frequency filter when the driver device is connected to the mains. Further, the Zener diode provides a load current while the capacitor of the frequency filter is charged, so that electrical power is provided to the load very quickly after connection to the mains. Therefore, the specified output of the load, in particular the light emission of the LED unit, can be reached more quickly.

In a preferred embodiment, the controllable resistor comprises a transistor. This embodiment is a simple solution enabling a controllable resistor to provide the load current and to cut off the AC components of the rectified voltage. The transistor can be formed of a bipolar transistor or a MOSFET.

In a further preferred embodiment of the present invention, the controllable resistor comprises a Darlington stage. This circuit provides a low current consumption at the control input because of the typically high current gain of a Darlington configuration. As a consequence, the value of the resistor of the frequency filter can be rather large, reducing the losses in the frequency filter.

In a further embodiment, the capacitor is coupled in parallel to the load, in particular the LED unit, and the control input of the controllable resistor. This embodiment provides the possibility to define a precise and stable constant voltage to be applied to the load, whereby the efficiency of the system is increased.

In a further preferred embodiment of the present invention, a resistor is connected in parallel to the capacitor to decrease a voltage dropping across the capacitor. This increases the voltage drop across the controllable resistor and decreases the voltage drop across the capacitor. Thus, an offset is provided for the voltage applied to the controllable resistor, so that a small voltage drop of the supply voltage does not result in a drop of the load current.

In a further preferred embodiment, the load is an LED unit and a modulator is coupled in series to the LED unit, wherein a substantially constant voltage is applied to the LED unit and the modulator by means of the frequency filter to modulate the drive current and to modulate the emitted light output. This embodiment provides a possibility to modulate the light output and to transmit signals by means of the LED unit.

In a preferred embodiment of the driver device comprising a modulator, the controllable switch comprises a transistor controlled by a control unit. This embodiment provides a simple solution to modulate the load current and provides a high switching speed of the controllable switch.

In a further preferred embodiment, the modulator comprises a second controllable switch controlled by the controller and coupled in series to a second resistor, wherein the second controllable switch and the second resistor are coupled in parallel to the first controllable switch to provide three different drive current levels. This embodiment provides a possibility to provide three different current levels symmetrically around the DC level which does not provide visible flicker of the LED units and which does not influence the efficiency of the LED unit. In an alternative embodiment, more than three parallel paths are connected to the load to provide more than three different current levels. Hence, a high switching speed between the current levels can be realized.

BRIEF DESCRIPTION OF THE DRAWINGS

These and other aspects of the invention will be apparent from and elucidated with reference to the embodiment(s) described hereinafter. In the following drawings.

DETAILED DESCRIPTION OF THE INVENTION

Figure 1:
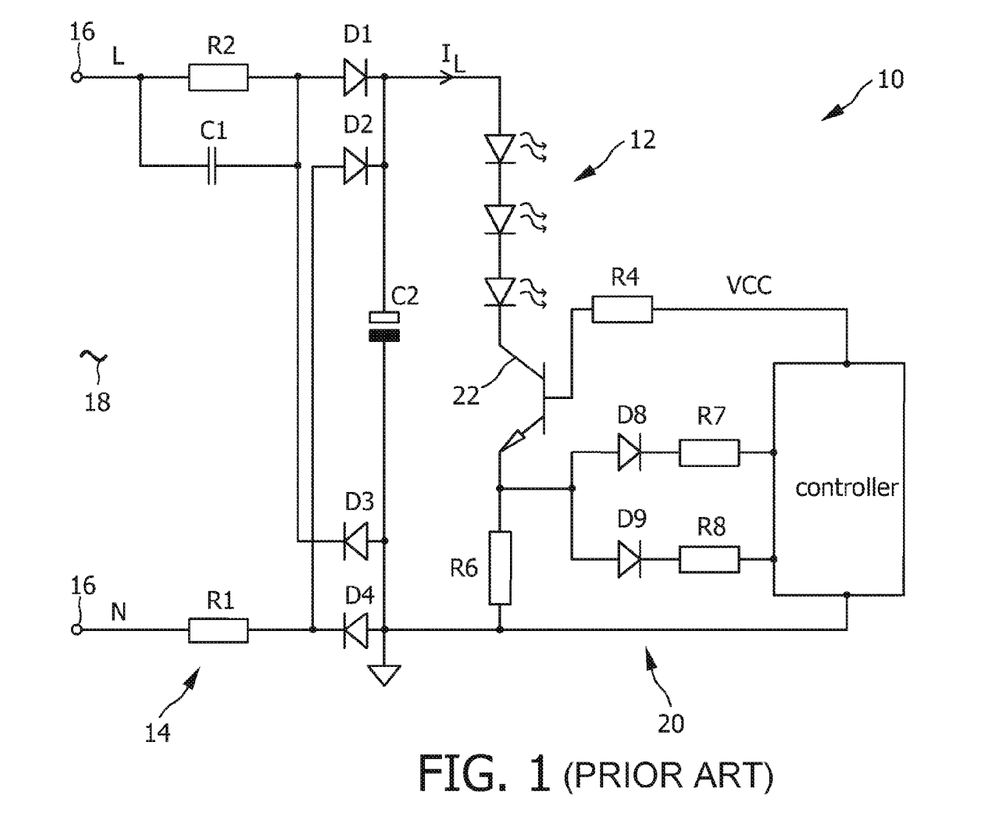
FIG. 1 shows a schematic block diagram of a known driver circuit for an LED unit including a current source to modulate the load current.

An embodiment of a known driver device 10 for driving an LED unit is schematically shown in FIG. 1. The driver device 10 comprises an input unit 14 coupled to terminals 16 for connection to mains power supply 18. The input unit 14 is connected in parallel to the LED unit 12. The LED unit 12 is connected in series to a modulator unit 20, which comprises a programmable current source 22 to modulate a load current $I_L$ of the LED unit 12.

The light modulation according to this embodiment is provided for LED units, wherein the light output of the LEDs follows rather quickly the electric current $I_L$ driven by the current source 22. The current source 22 provides in this particular case a Manchester pulse of the load current $I_L$, as described below. The LED unit 12 comprises a plurality of LEDs connected in series. These LEDs can be low or high voltage LEDs or series-connected LEDs, wherein the forward voltage drop is less than the minimum of the rectified and smoothened input voltage supplied from the mains. The input unit 14 comprises a plurality of components including capacitors, diodes and resistors. To adapt the mains voltage to the LED voltage without power loss, the capacitor C1 is provided in the input unit. The change of this capacitor C1 determines the average DC voltage of a capacitor C2, which is provided in parallel to the output of the input unit 14.

The modulator 20 comprises the programmable current source 22. The current source 22 is connected to a resistance R4 and a resistance R6 to control the load current $I_L$ of the LED unit. A controller connected to the current source 22 is provided to switch a series connection of a diode D8 and a resistance R7 to ground or to a supply voltage and to switch a series connection of a diode D9 and a resistance R8 to ground or a supply voltage. A supply voltage $V_{CC}$ is provided to the controller and the resistance R6, wherein a voltage source providing the supply voltage $V_{CC}$ is not shown in FIG. 1. While switching takes place of one of these diode-resistance combinations to the supply voltage, no current is passed through this path, while if said combination is connected to ground, a small additional current is passed through this path. Thus, the controller is able to provide three different levels of the load current $I_L$ to provide a symmetrical modulation around the DC level of the load current $I_L$. If more different levels of the load current $I_L$ and the respective light emission are required, more control paths need to be implemented in the modulator 20.

Figure 2:
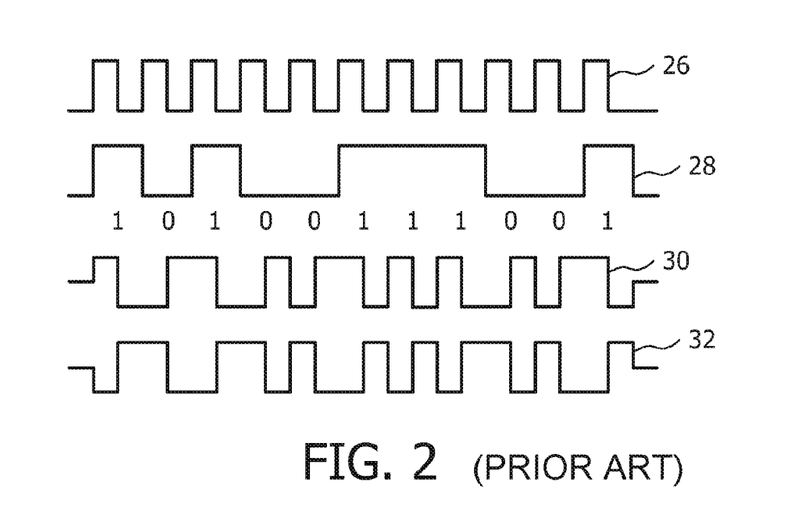
FIG. 2 shows a schematic diagram of a Manchester code.

FIG. 2 shows a clock signal 26, a data signal 28 of the data to be transmitted, a first Manchester code 30 and an inverse Manchester code 32 (according to IEEE 802.3). The Manchester codes 30, 32 are formed of a signal alteration around the DC level of the respective value, e.g. a voltage or a current. The data signal 28 is transformed to the Manchester code, wherein a high level data signal corresponds to a change in the Manchester code 30 from high level to low level or in the inverse Manchester code 32 from low level to high level. Thus, a modulation of the load current $I_L$ is realized with three different levels, wherein the light signal has a constant average value and no visible flicker of the light output is produced if the modulation frequency is high enough.

Figure 3:
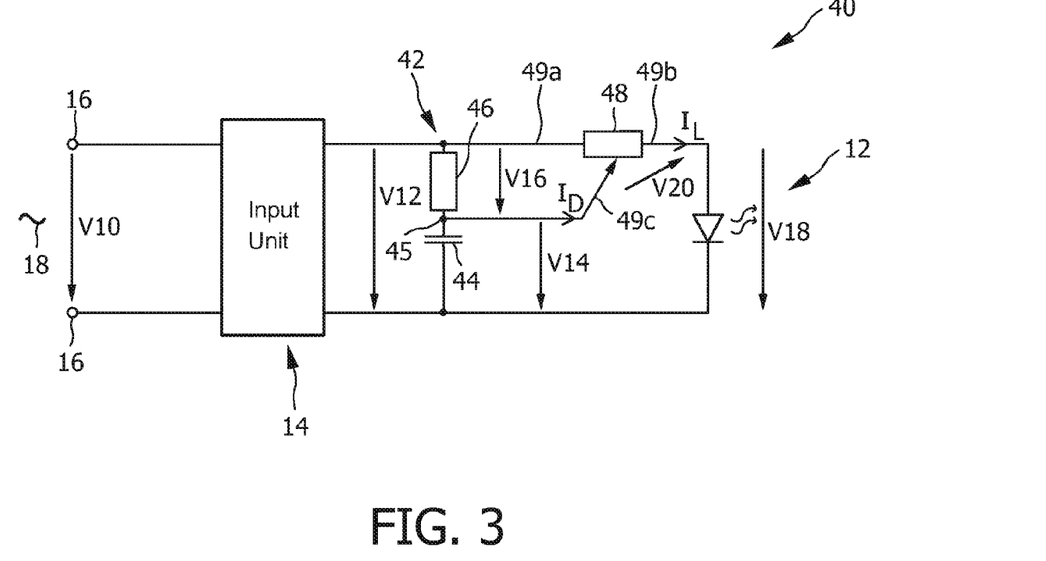
FIG. 3 shows a schematic block diagram of a driver device for driving an LED according to a first embodiment of the present invention.

A first embodiment of a driver device 40 according to the present invention is schematically shown in FIG. 3. The driver device 40 comprises the input unit 14 comprising the terminals 16 for connection to the mains 18. The input unit 14 preferably comprises a rectifier bridge, such as a known full-bridge or half-bridge rectifier, for rectifying an AC input voltage V10 provided from mains voltage supply 18 into a rectified voltage V12. The input unit 14 is connected in parallel to a frequency filter 42 to apply or provide the rectified voltage V12 to the frequency filter 42. According to this embodiment, the frequency filter 42 is formed of a capacitor 44 and a resistor 46. The frequency filter is designed in such a way that a substantially constant voltage V14 drops across the capacitor 44 and a filter voltage V16 drops across the resistor 46. Thus, the rectified voltage V12 is divided into the substantially constant voltage V14 and the filter voltage V16. The filter voltage V16 comprises remaining AC components (ripple) of a rectified voltage V12. The driver device 40 further comprises a controllable resistor 48 having three electrical contacts 49. An input contact 49*a* of the controllable resistor 48 is connected to the power input unit 14. An output contact 49*b* of the controllable resistor 48 is connected to the load 12. A control contact 49*c* is connected to a node 45 between the resistor 46 and the capacitor 44. A control side or a control input of the controllable resistor 48 is formed between the output contact 49*b* and the control contact 49*c*. The resistor 46 of the frequency filter 42 is connected to the input contact 49*a* and the control contact 49*c* of the controllable resistor 48. The controllable resistor 48 provides the load current $I_L$ to the LED unit 12. The constant voltage V14 is applied to the LED unit 12 and the control side of the controllable resistor 48 connected in parallel to the capacitor 44. A load voltage V18 drops across the LED unit 12 and a control voltage V20 drops across the control side of the controllable resistor 48, wherein V14=V18+V20. The controllable resistor 48 is driven by a drive current $I_D$, which is controlled by the control voltage V20.

Because of the parallel connection of the resistor 46 to the controllable resistor 48, the remaining AC components of the rectified voltage V12 are cut off, while the load current $I_L$ provided to the LED unit 12 is a substantially constant DC current depending on the load voltage V18 and the resistance of the load 12. Since the substantially constant supply voltage V14 dropping across the capacitor 44 is supplied to the LED unit 12 and the control side of the controllable resistor 48, the LED unit 12 is powered by the substantially constant load voltage V18 and the load current $I_L$.

In a preferred embodiment of the driver device 40, a diode (not shown in FIG. 3) is connected forward-biased in parallel to the control side of the controllable resistor 48 to limit the voltage V14, which is slightly larger than V18. Alternatively, a diode e.g. a Zener diode, is connected reverse-biased in parallel to the resistor 46 to limit the voltage V14.

The controllable resistor 48 is preferably formed by a transistor, wherein the input contact 49*a* corresponds to the collector or the source contact, the output contact 49*b* corresponds to the emitter or drain contact and the control contact 49c corresponds to the gate or base contact, respectively. In the case that the controllable resistor 48 is a bipolar transistor, the diode parallel to the control side is formed by the base-emitter path. In the case that the controllable resistor 48 is a MOSFET, the diode (not shown in FIG. 3) is preferably connected in parallel to the gate-drain path.

Figure 4:
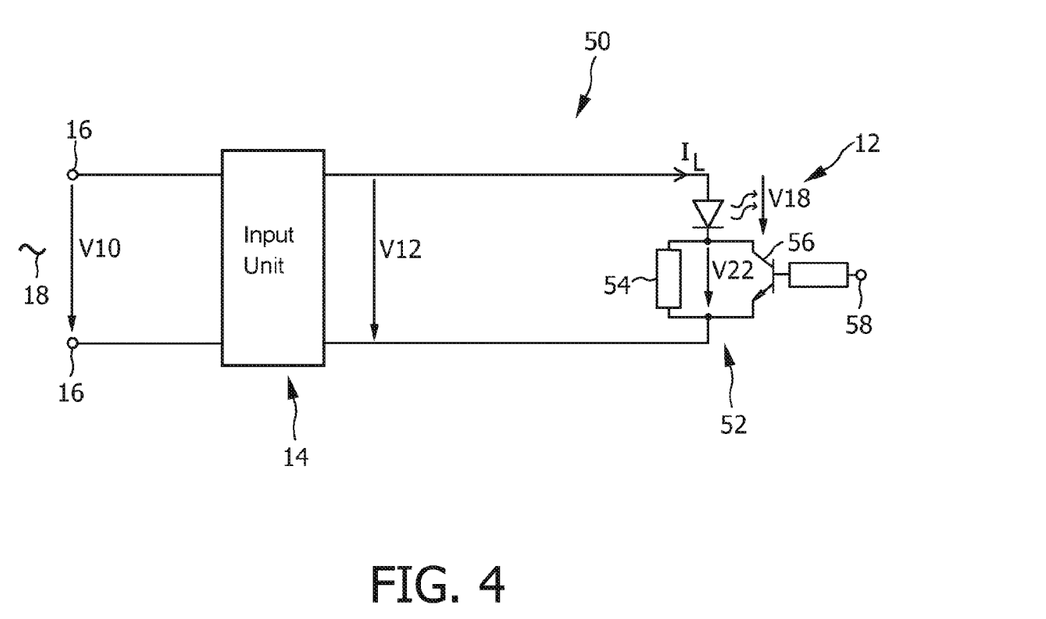
FIG. 4 shows a schematic diagram of a driver device to modulate the load current of an LED unit and to modulate the light output.

A further alternative embodiment of a driver device 50 is shown in FIG. 4. wherein identical elements are denoted by identical reference numerals, and only the differences are explained in detail.

The input unit 14 is connected in parallel to the LED unit 12, which is connected in series to a modulator 52. The modulator 52 comprises in parallel a resistor 54 and a controllable switch 56, which is preferably formed of a transistor. The controllable switch 56 is controlled via a control input 58, which is preferably connected to a controller unit. A modulator voltage V22 drops across the modulator 52.

The load current $I_L$ is modulated by switching the controllable switch 56. If the switch is closed, the LED unit 12 is directly connected to ground and the rectified supply voltage V12 is directly applied to the LED unit 12 and the modulator 52, wherein V12=V18+V22. If the controllable switch 56 is open, the load current $I_L$ is passed through the resistor 54 such that the load current 54 is reduced to a lower level. Thus, the load current 54 is switchable to two different levels by switching the controllable switch 56. Since the light output of the LED unit 12 corresponds to the load current $I_L$, the light output can be modulated by actuating the switch 56 via the control input 58.

As shown in FIGS. 3 and 4, these two embodiments can be used separately from each other in different applications.

Figure 5:
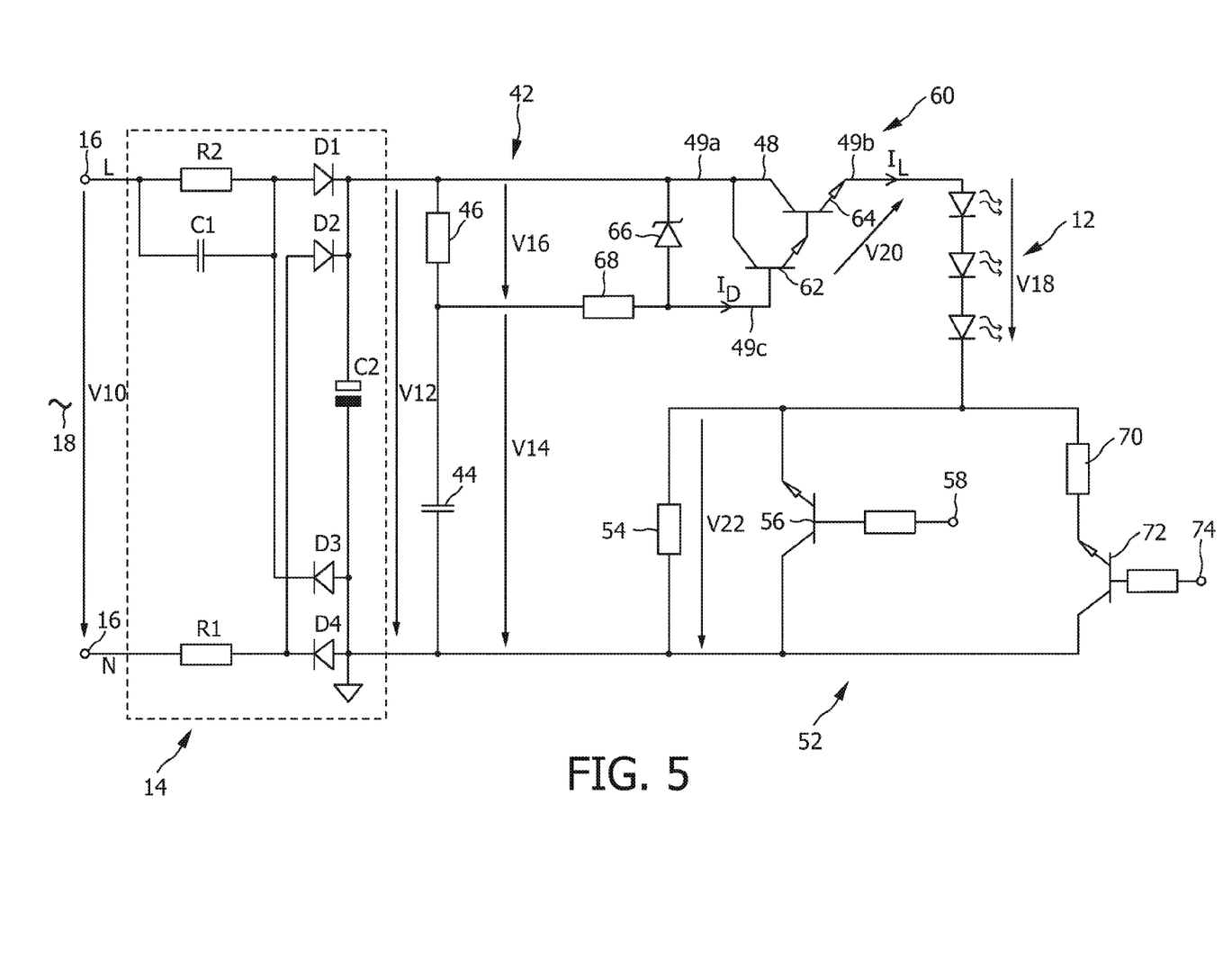
FIG. 5 shows a detailed schematic block diagram of an embodiment of the driver device according to the invention.

FIG. 5 shows schematically a driving device 60 according to a further embodiment of the present invention, wherein identical elements are denoted by identical reference numerals, and only the differences are explained in detail. The rectified supply voltage V12 is applied to the frequency filter 42. The frequency filter 42 comprises the resistor 46 and the capacitor 44. The substantially constant voltage V14 drops across the capacitor 44 and the filter voltage V16 drops across the resistor 46. The resistor 46 is connected in parallel to the input contact 49a and the control contact 49c of the controllable resistor 48, which is formed of a Darlington stage 48. The Darlington stage 48 comprises a first transistor 62 and a second transistor 64 connected to each other in a Darlington configuration. The filter voltage V16 dropping across the resistor 46 is applied to the Darlington stage 48 and forms in this particular case the collector-base voltage of the first transistor 62. The control voltage V20 is applied to the control side or control input of the Darlington stage 48, and forms in this particular case the base-emitter voltage of the Darlington stage 48, and controls the drive current $I_D$, which drives the Darlington stage 48. The Darlington stage 48 provides the load current $I_L$. A Zener diode 66 is connected in parallel to the collector-base path of the Darlington stage 48 to limit the voltage V16. Further, the Zener diode 66 is provided to charge the capacitor 44 when the input unit 14 is initially connected to the mains 18. An important advantage of the Zener diode 66 in this configuration is that the load current $I_L$ rises quickly after connection to the mains 18 while the capacitor 44 is charged. Hence, the LED unit 12 is powered quickly after the driving device 60 is connected to the mains 18. Further, a resistor 68 is connected to the control contact 49c of the Darlington stage 48 to deliver the drive current $I_D$ to the control contact 49c of the Darlington stage 48 from the voltage V14 and to limit the charging current of the filter capacitor 44 when the system is initially connected to the mains 18.

Thus, the constant voltage V14 is a smoothed representation of the minimum rectified supply voltage V12. The substantially constant voltage V14 is applied to the control input of the Darlington stage 48, the LED unit 12 and the modulator 52, wherein remaining AC components of the rectified supply voltage V12 are cut off by means of the Darlington stage 48. The substantially constant voltage V14 is applied to the control input, the LED unit 12 and the modulator 52, wherein V14=V20+V18+V22. Thus, the LED unit 12 is powered by the substantially constant load voltage V18 and the load current $I_L$. The load voltage V18 and the load current $I_L$ form a substantially constant electrical power provided to the load 12. Therefore, the efficiency of the system is nearly independent of variations of the mains voltage V10.

Further, the modulator 52 is connected in series to the LED unit 12. The modulator voltage V22 drops across the modulator 52. The modulator comprises the resistor 54 and the controllable switch 56 connected in parallel to each other. The modulator 52 further comprises a second resistor 70 and a second controllable switch 72 connected in series to each other. The second resistor 70 and the second switch 72 are connected in parallel to the switch 56 and the resistor 54. The second switch 72 is controlled via a control input 74 preferably connected to a controller.

The modulator 52 can provide the load current $I_L$ at three different levels by switching the switches 56, 72. If the second switch 72 is closed, the load current $I_L$ passes through the resistor 54 and the second resistor 70 and provides a medium-load current level. If the switches 56, 72 are opened, the current $I_L$ passes through the resistor 54, whereby a low level of the load current $I_L$ is provided. If the switch 56 is closed, the load current $I_L$ passes through the switch 56 to ground, whereby a high level of the load current $I_L$ is provided. In this case, the modulator voltage V22 is at the lowest level, i.e. almost zero. Thus, the modulator 52 can provide three different levels of the load current $I_L$. In an embodiment of the driving device 60, the modulator 52 comprises more than three parallel switchable paths to provide more different current levels. In that embodiment, the modulator 52 can provide as many current levels as the number of parallel paths implemented.

Thus, the driving device 60 provides a high efficiency for the LED unit and the possibility of modulating the light output of the LED unit 12.

Figure 6:
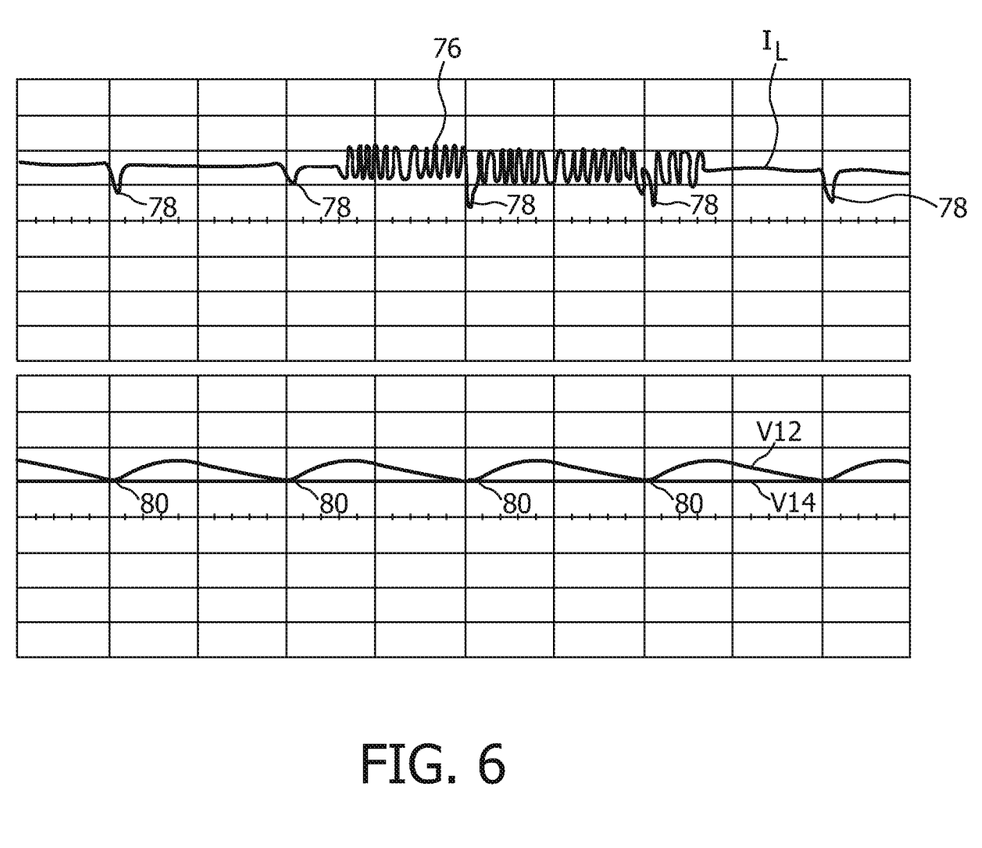
FIG. 6 shows a diagram of the load current, the rectified supply voltage and the constant voltage of the device according to FIG. 5.

FIG. 6 shows a diagram of the load current $I_L$, the constant supply voltage V14 and the rectified supply voltage V12 provided by the driving device 60 according to FIG. 5. The load current $I_L$ is rather constant and provided with a modulated portion 76. Further, the load current $I_L$ shows negative peaks or dips shown at 78. The constant supply voltage V14 shows a constant behavior over time. The rectified supply voltage V12 comprising an AC component is also shown in FIG. 6. At certain times, denoted by 80, the rectified supply voltage V12 equals or falls below the constant voltage V14. At this time the voltage drop across the controllable resistor 48 is at its minimum. Then, also the load voltage V18 across the LED unit 12 drops, resulting in a current dip. To avoid negative peaks in the load current $I_L$ shown at 78, the filter voltage V16 needs to be increased such that the filter voltage V16 does not fall to the level of the constant supply voltage V14 or even below this voltage V14.

Figure 7:
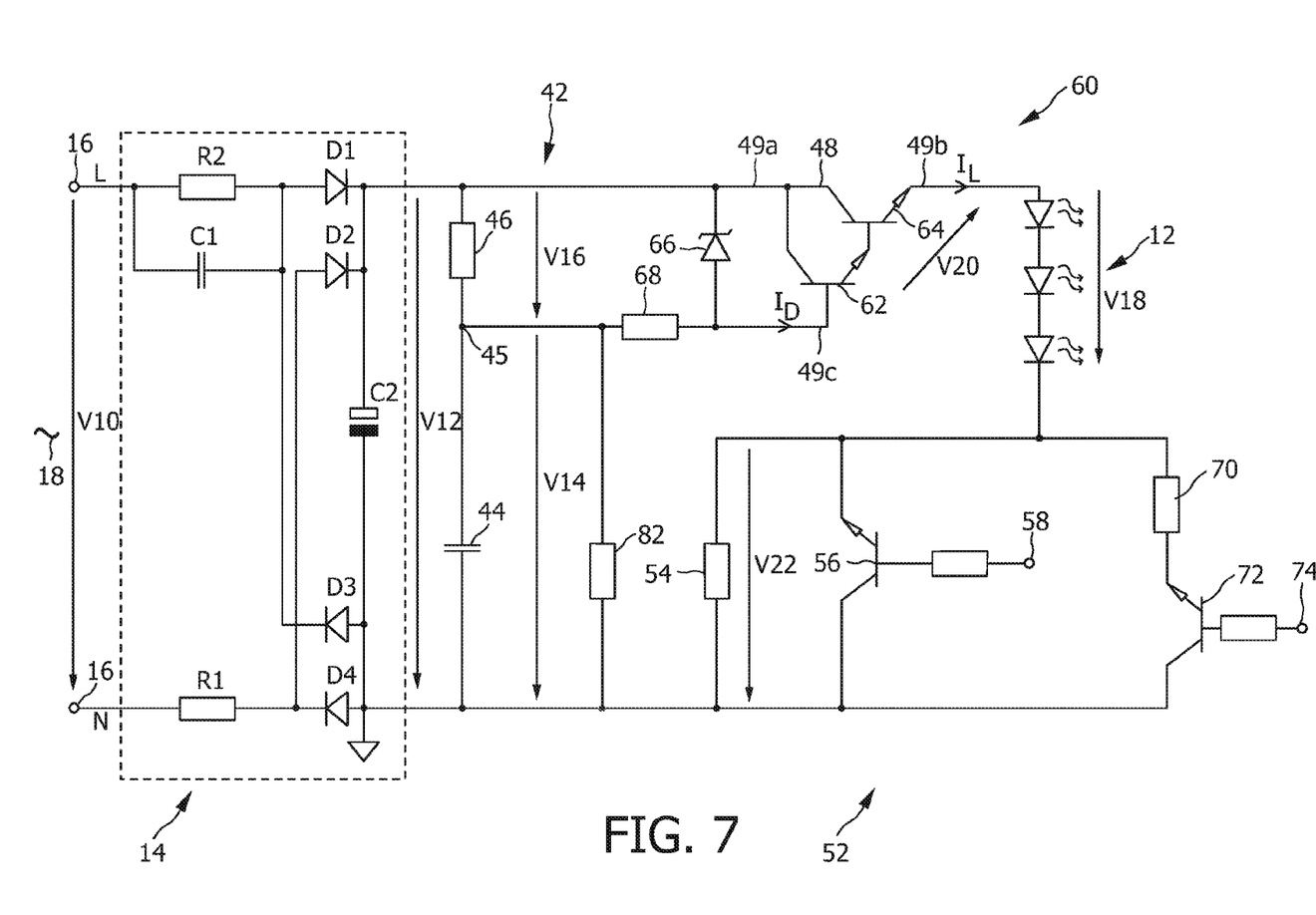
FIG. 7 shows a schematic block diagram of a further embodiment of the present invention.

In FIG. 7, a further embodiment of the drive device 60 is shown, wherein identical elements are denoted by identical reference numerals, and only the differences are explained in detail. In this embodiment, a further resistor 82 is connected in parallel to the capacitor 44. This resistor 82 lowers the voltage V14 dropping across the capacitor 44 and increases the filter voltage V16 dropping across the resistance 46. Thus, the filter voltage V16 applied to the Darlington stage 48 is increased and does not fall to or below the constant supply voltage V14.

Figure 8:
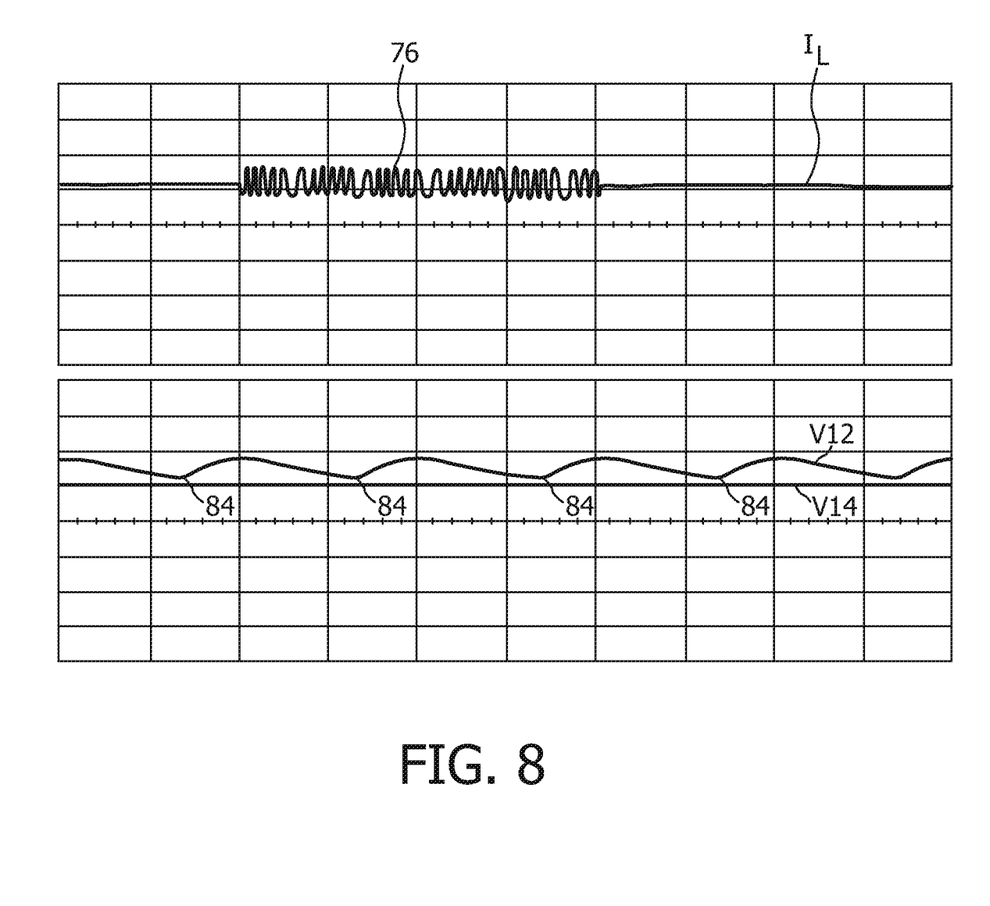
FIG. 8 shows a diagram of the load current, the rectified supply voltage and the constant voltage provided by the embodiment according to FIG. 7.

FIG. 8 shows a time diagram of the load current $I_L$, the constant supply voltage V14 and the rectified supply voltage V12 according to the drive device 60 of FIG. 7 including the resistance 82. The load current $I_L$ comprises the modulated portion 76. The constant supply voltage V14 is a constant signal and the rectified supply voltage V12 is identical to the signal shown in FIG. 6 having an offset with respect to the constant supply voltage V14. Thus, even if the rectified supply voltage V12 is decreased at certain times shown at 84, the rectified supply voltage V16 does not drop to or below the constant supply voltage V14. Thus, the load current $I_L$ is constant over time without any negative peaks or dips as shown at 78 in FIG. 6.

Thus, the driving device 60 provides a substantially constant load voltage V18 applied to the LED unit 12 and a constant load current $I_L$ passing through the LED units. Hence, the efficiency of the LED unit 12 is increased even if the mains voltage 18 varies. Further, the driving device 60 provides a possibility to modulate the light output by modulating the load current $I_L$ as shown in FIG. 8 by means of the modulated portion 76 of the load current $I_L$.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope thereof.

The invention claimed is:

1. A device for providing power to an LED unit and modulating light emitted from the LED unit, the device configured to be connected between a driver and the LED unit, the device comprising:
   a controllable resistor configured to receive from the driver a driver output voltage and to provide a load current to power the LED unit,
   a frequency filter for providing a substantially constant voltage to the LED unit, the frequency filter being connected to the controllable resistor to provide a substantially constant electrical power to the LED unit, wherein the frequency filter is connected to the driver to derive a voltage from the driver output voltage, wherein the voltage is at least partially applied to a series connection formed by the control input of the controllable resistor and the LED unit, and
   a modulator coupled in series to the LED unit for modulating the drive current and for modulating the emitted light output, wherein the substantially constant voltage applied to the LED unit is further applied to the modulator by means of the frequency filter.

2. The device of claim 1, wherein the LED unit comprises one or more LEDs.

3. The device of claim 1, wherein the driver is a component of a lighting apparatus.

4. The device of claim 1, wherein the frequency filter is a low-pass filter comprising a capacitor and a resistor.

5. The device of claim 4, wherein the resistor is coupled to the controllable resistor, wherein a substantially constant voltage drops across the capacitor and a second voltage including an AC-component of the rectified supply voltage drops across the resistor.

6. The device of claim 5, wherein a control contact of the controllable resistor is connected to a node between the resistor and the capacitor.

7. The device of claim 4, wherein a voltage limiting device is coupled to the controllable resistor to limit the second voltage dropping across the resistor.

8. The device of claim 1, wherein the controllable resistor comprises a transistor.

9. The device of claim 4, wherein a resistor is connected in parallel to the capacitor to decrease the voltage dropping across the capacitor.

10. The device of claim 1, wherein the modulator, which is coupled in series to the LED unit for modulating a drive current driving the LED unit and for modulating the light output emitted from the LED unit, the modulator including a resistor and a controllable switch coupled in parallel to each other to provide two different drive current levels.

11. The device of claim 10, wherein the controllable switch comprises a transistor controlled by a control unit.

12. The device of claim 10, wherein the modulator comprises a second controllable switch controlled by the controller and coupled in series to a second resistor, wherein the second controllable switch and the second resistor are coupled in parallel to the first controllable switch to provide at least three different drive current levels.

13. A light apparatus comprising:
   an LED unit comprising one or more LEDs, and
   the device of claim 1, wherein the device is configured to be connected between a driver and the LED unit.

14. A device for providing power to an LED unit and modulating light emitted from the LED unit, the device configured to be connected between a driver and the LED unit, the device comprising:
   a controllable resistor configured to receive from the driver a driver output voltage and to provide a load current to power the LED unit,
   a frequency filter for providing a substantially constant voltage to the LED unit, the frequency filter being connected to the controllable resistor to provide a substantially constant electrical power to the LED unit, wherein the frequency filter is connected to the driver to derive a voltage from the driver output voltage, wherein the voltage is at least partially applied to a series connection formed by the control input of the controllable resistor and the LED unit, wherein the frequency filter comprises a capacitor coupled to the controllable resistor so that a voltage provided by the capacitor is at least partially applied to a control input of the controllable resistor as a control voltage to drive the controllable resistor, and
   a modulator coupled in series to the LED unit for modulating the drive current and for modulating the emitted light output, wherein the substantially constant voltage applied to the LED unit is further applied to the modulator by means of the frequency filter.

15. The device of claim 14, wherein the driver is a component of a lighting apparatus.

16. The device of claim 14, wherein the frequency filter is a low-pass filter.

17. The device of claim 14, wherein a resistor is coupled to the controllable resistor, wherein a substantially constant voltage drops across the capacitor and a second voltage including an AC-component of the rectified supply voltage drops across the resistor.

18. The device of claim 14, wherein the modulator, which is coupled in series to the LED unit for modulating a drive current driving the LED unit and for modulating the light output emitted from the LED unit, the modulator including a resistor and a controllable switch coupled in parallel to each other to provide two different drive current levels.

19. A method of providing power to an LED unit and modulating light emitted from the LED unit, comprising the steps of:

receiving from the driver a driver output voltage and providing the supply voltage to a frequency filter, providing a modulated load current to the LED unit by means of a controllable resistor and a modulator, to power the LED unit, wherein the modulator is coupled in series to the LED unit, providing a substantially constant voltage to the LED unit and the modulator by means of the frequency filter, and providing a substantially constant electrical power to the LED unit by means of the frequency filter connected to the controllable resistor, wherein the frequency filter is connected to the driver to derive a voltage from the driver output voltage, wherein the voltage is at least partially applied to a series connection formed by the control input of the controllable resistor and the LED unit.

20. The device of claim 19, wherein the frequency filter is a low-pass filter.

* * * * *